April 18, 1961 J. W. SODERBERG 2,980,887
AUTOMATIC TRAFFIC CONTROL
Filed May 22, 1957 7 Sheets-Sheet 1
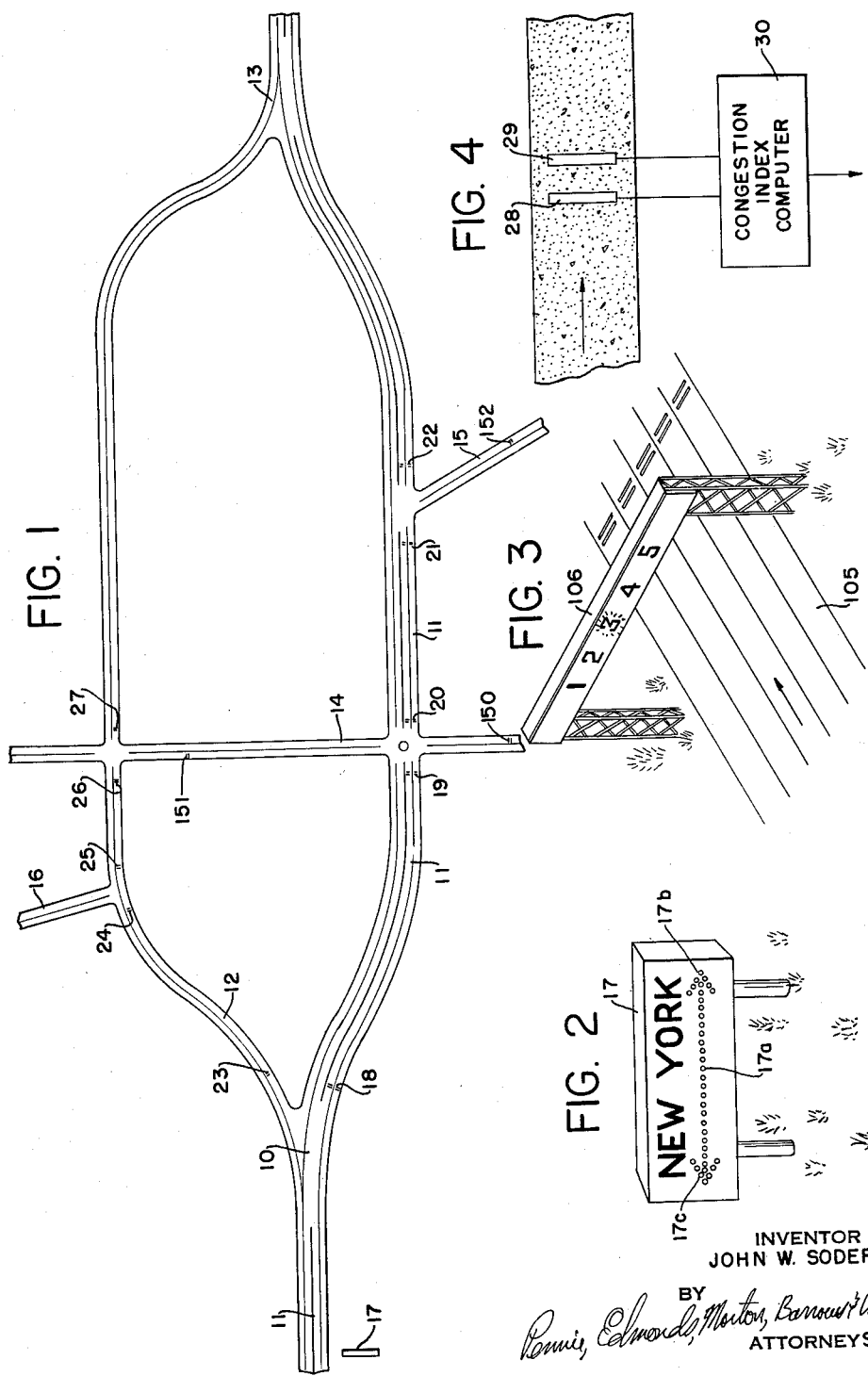
INVENTOR
JOHN W. SODERBERG
BY
Pennie, Edmonds, Morton, Barrows & Taylor
ATTORNEYS April 18, 1961 J. W. SODERBERG 2,980,887
AUTOMATIC TRAFFIC CONTROL
Filed May 22, 1957 7 Sheets-Sheet 3
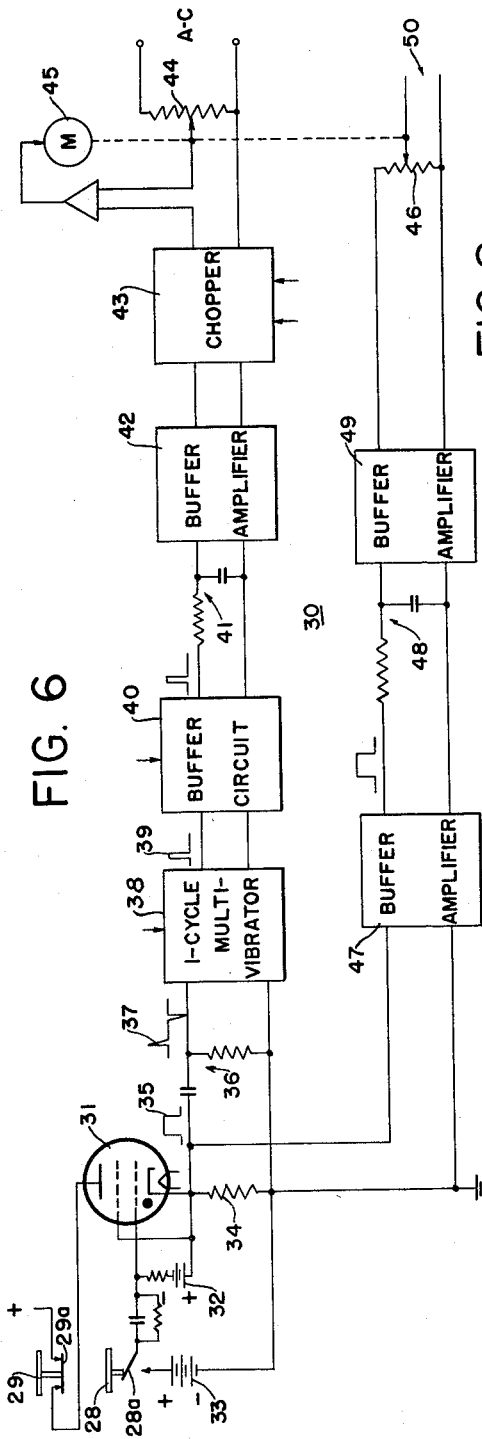
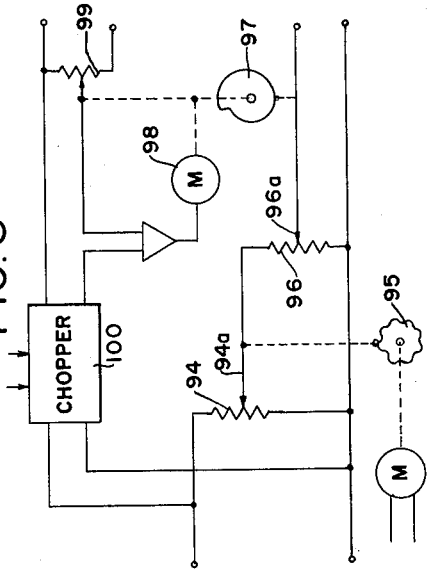
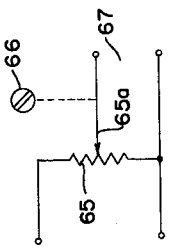
INVENTOR
JOHN W. SODERBERG
BY
ATTORNEYS

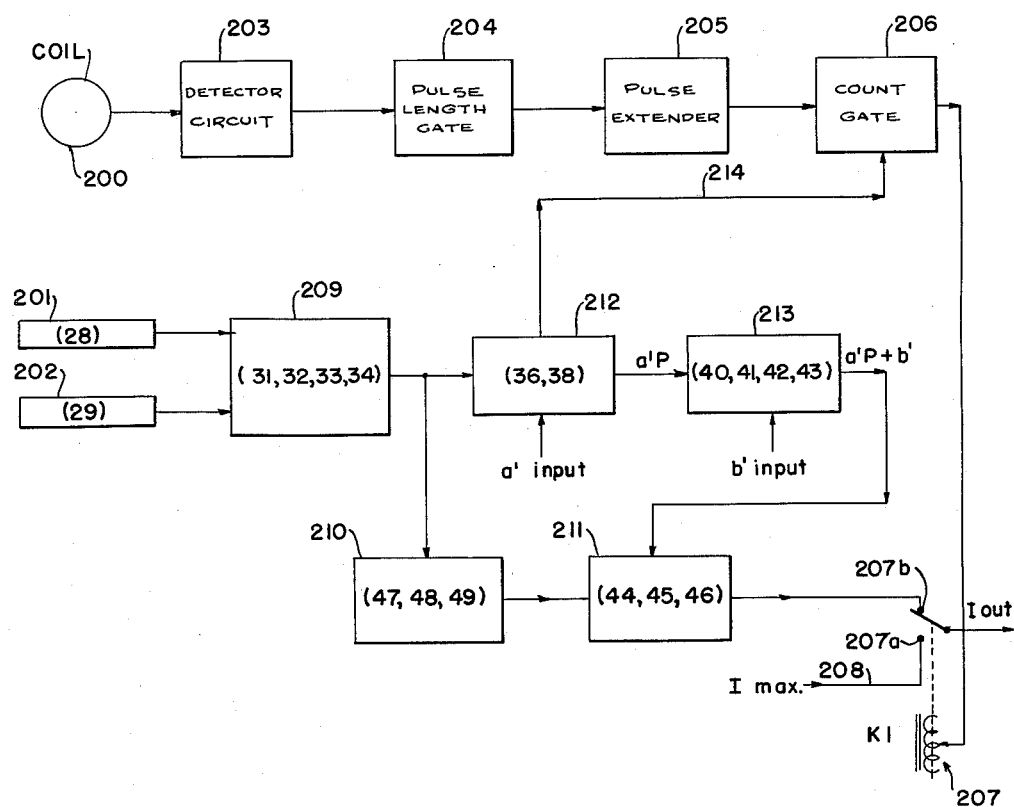

April 18, 1961  J. W. SODERBERG  2,980,887
AUTOMATIC TRAFFIC CONTROL
Filed May 22, 1957  7 Sheets-Sheet 5

INVENTOR
JOHN W. SODERBERG
BY
Pennie, Edmonds, Morton, Barrows & Taylor
ATTORNEYS

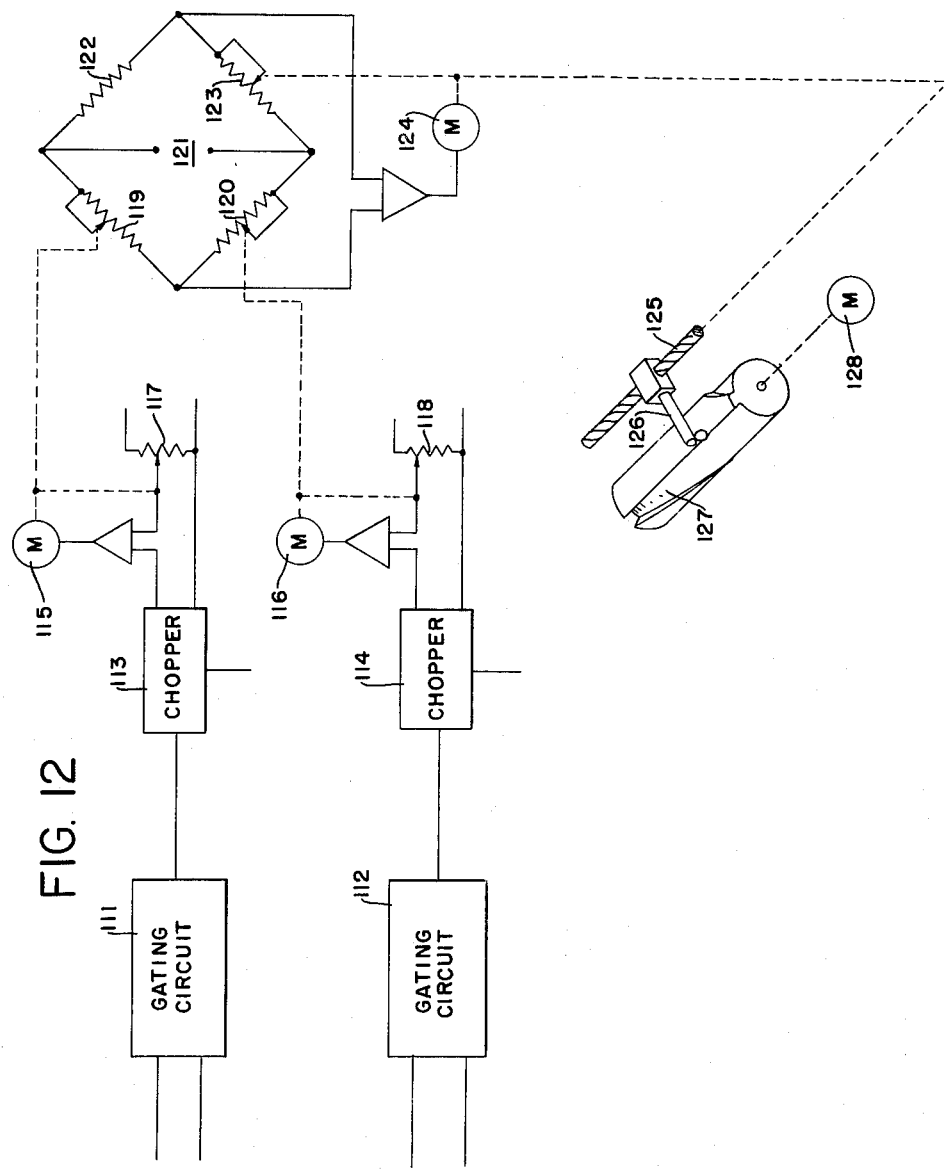

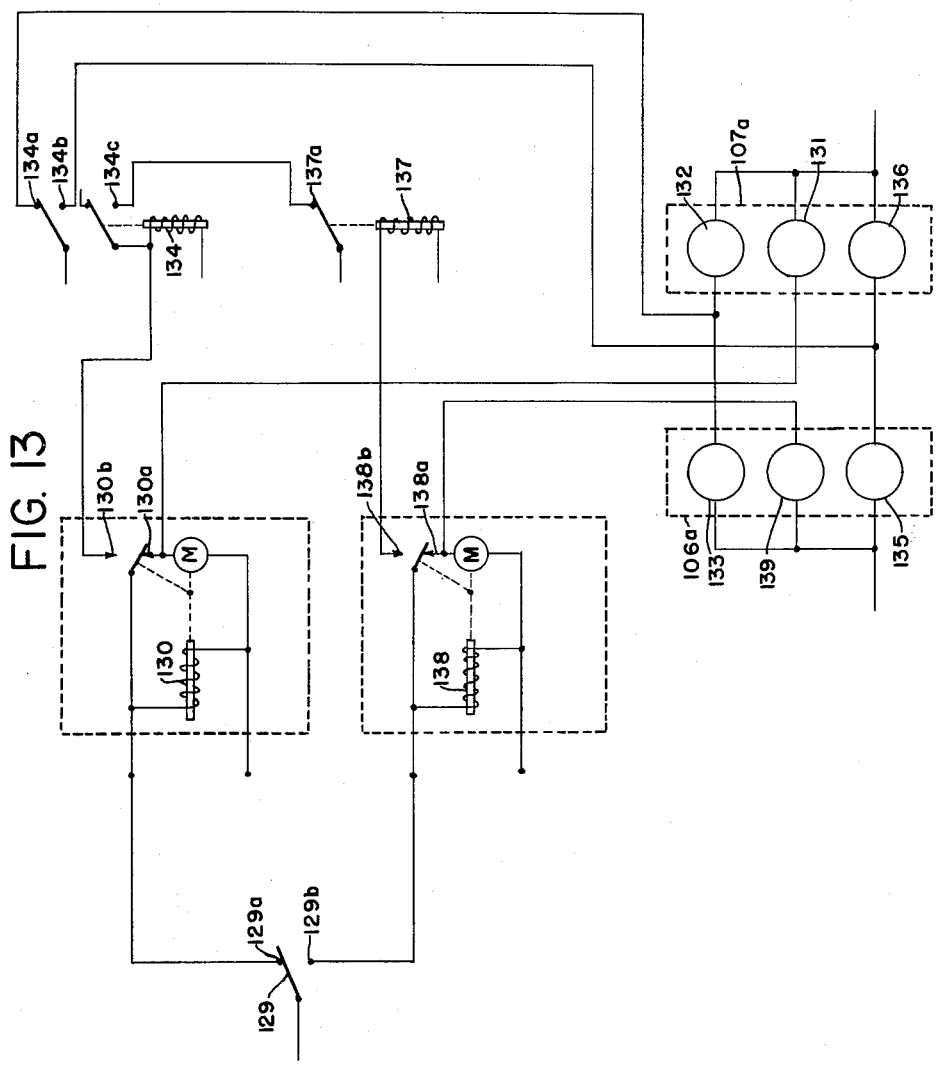

# United States Patent Office 2,980,887
Patented Apr. 18, 1961

2,980,887
AUTOMATIC TRAFFIC CONTROL

John W. Soderberg, Niantic, Conn. (Box 604, Hudson, N.Y.), assignor of one-fourth to Robert P. Strakos, one-fourth to John Malasky, and one-fourth to John F. Kearney, all of Hudson, N.Y.

Filed May 22, 1957, Ser. No. 660,932

2 Claims. (Cl. 340—40)

The present invention relates to improvements in the automatic control of vehicular traffic, and more particularly, to improved method and apparatus for controlling the flow of vehicular traffic on highways and the like in accordance with realistic traffic flow criteria.

In connection with the control of vehicular traffic flow at a highway junction, or on a multiple lane highway, for example, it has been heretofore proposed to detect the number and rate of passage of vehicles over certain of the highways or highway lanes and to direct the flow of traffic in accordance with determinations thus made, by means of automatic control circuitry. Improved arrangements for this purpose are described and claimed in the copending application of John F. Kearney and John W. Soderberg, Serial No. 587,304, filed May 25, 1956 now United States Patent No. 2,892,995, issued June 30, 1959.

While the invention described in the Kearney et al. application is entirely satisfactory for its intended uses, it is not sufficiently comprehensive to be utilized with complete satisfaction in certain complex multi-highway and multi-lane highway systems. Accordingly, the present invention provides improved arrangements for automatically controlling the flow of traffic, by means of which a number of complex factors affecting traffic flow are taken into consideration, and the traffic is directed in a manner utilizing the highway facilities to greatest advantage and with maximum safety.

In accordance with the invention, the control of vehicular movement is based on factors realistically reflecting actual traffic conditions at one or more points, so that corrective action is taken, automatically, to prevent undesirable or unsafe conditions, or to quickly remedy such undesirable conditions as may arise from time to time. More specifically, the invention provides a control system in which factors such as the number of vehicles moving in a particular flow path and the speed of movement of the vehicles are automatically determined and interrelated in a manner reflecting conditions of traffic "congestion," and corrective control of the traffic flow is carried out automatically, in accordance with the thus determined "congestion" conditions. Thus, in certain cases, a large number of vehicles may be moving in a particular flow path without creating congestion, in the sense that traffic flow would be impaired or rendered unsafe. Likewise, a smaller number of cars moving at slow speed, for example, might cause congested and unsafe conditions. The new method and apparatus interrelates factors reflecting congestion, or its absence, and provides for the regulation of traffic flow in accordance therewith.

One of the important specific features of the invention resides in the provision of improved traffic control arrangements whereby the factors of vehicle movement and speed are interrelated on a continuous basis, with reference to time, to provide an indication of traffic congestion in a form usable for automatically controlling traffic directive indicia. In accordance with the invention, the average number of vehicles moving past a measuring point is effectively interrelated or integrated with the average speed of the vehicles in a manner reflecting the actual traffic flow conditions at such point and/or the effect of the conditions at that point on another point in the traffic flow path.

Another important specific feature of the invention resides in the provision of integrated control arrangements by means of which traffic conditions at a plurality of points may be determined and interrelated to provide an indication of the effect of such traffic conditions at another point as, for example, an intersection of highways or division of highway lanes located in advance of the measuring points. Existing traffic control devices with which I am familiar are all actuated by the traffic in the immediate vicinity of the control point, or points, and consequently are able to sense an undesirable situation only after its occurrence; corrective action is then necessary to alleviate the undesirable condition. However, in accordance with this invention, through the use of a multiplicity of remotely located measuring points, particularly on feeder routes, means are provided to initiate anticipatory corrective measures before critical situations arise, thus minimizing or eliminatng their effects.

Yet another specific advantageous feature of the invention resides in the provision of traffic control arrangements of the general type and having the general characteristics set forth above, which includes facilities operative to detect the presence in a highway lane, or lanes, of one or more vehicles, and operative in response to the failure of such vehicles to keep in motion to indicate a "congested" condition to vehicles approaching such lane, or lanes. Accordingly, in the event of an accident, or mechanical breakdown of an automobile, for example, whereby a line of vehicles is brought to a complete halt or to a very slow speed, the congested condition of the highway will be properly indicated and approaching vehicles will be directed to other highway facilities.

Advantageously, traffic control in accordance with the invention is carried out with electronic equipment arranged to receive various indicia of traffic conditions and to actuate traffic directive means in accordance therewith. However, it is contemplated that other means, such as mechanical devices, may be employed in the same or an equivalent manner. Accordingly, the invention, as hereinafter described with more particularity, is considered as residing in the method of control, as well as in the improved apparatus used for carrying out the new method.

For a better understanding of the invention, reference should be made to the following description and accompanying drawings, in which:

Fig. 1 is a simplified plan view of a complex highway system incorporating the traffic control means of the invention;

Fig. 2 is a perspective view of a traffic directive sign which may be employed in the new control system;

Fig. 3 is a fragmentary perspective view of a multi-lane highway, with a traffic directive sign, which may be advantageously employed in the new system;

Fig. 4 is a schematic representation of a highway lane, with traffic detecting and evaluating means of the invention associated therewith;

Fig. 6 is a schematic representation of circuit apparatus incorporated in the system of Fig. 5;

Fig. 6a is a modified form of the circuit apparatus of Fig. 6;

Figs. 7–10 are further schematic representations of circuit apparatus incorporated in the system of Fig. 5;

Figs. 12–13 are schematic representations of control circuit means employed in connection with a traffic control system for use at a highway intersection, such as that shown in Fig. 11.

Figure 5:
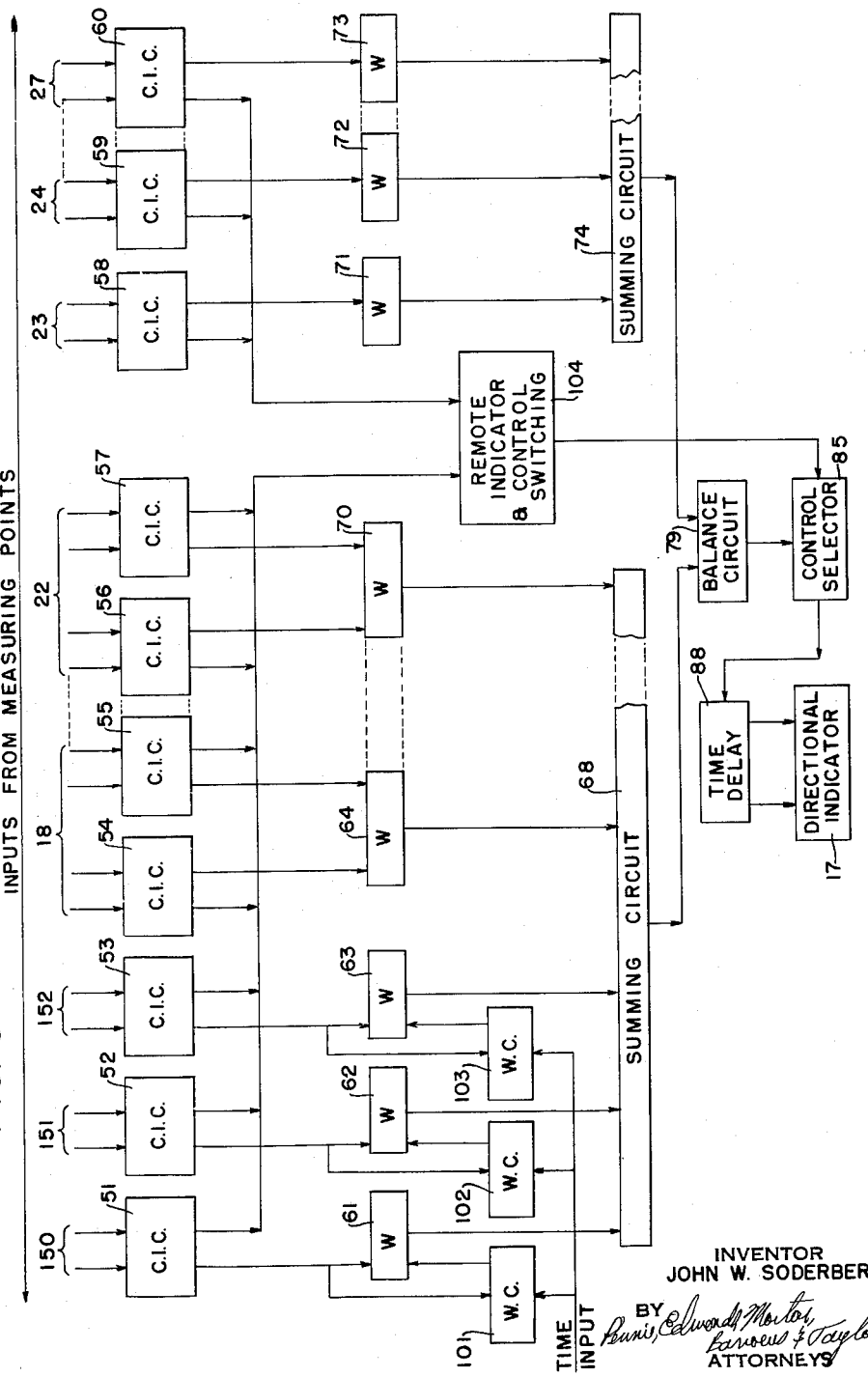
Fig. 5 is a schematic representation of a complex control arrangement incorporated in the new traffic control system for evaluating and translating traffic flow factors.

Every highway or highway system is designed for, or in fact has, a practical capacity for handling traffic, at which efficient use is made of the highway. Stated in another way, a highway may be most efficiently used when the traffic "congestion" is at a certain value. The "preferred congestion" value may be determined by surveys or in some cases by calculation.

In order to reflect the extent of use of a highway or other flow path, I advantageously utilize a "congestion index," based upon the equation $$I = a\frac{N}{N_0} + b\frac{S_0}{S}$$

where I is the congestion index, N is the actual number of vehicles per unit distance, S is the actual average speed of the vehicles, $N_0$ and $S_0$ are normal or "preferred" values of N and S and "a" and "b" are weighting constants reflecting the relative effects of vehicle density and speed. The constants a and b may be such that, numerally, the congestion index is one, when N equals $N_0$ and S equals $S_0$.

A derivation of the above equation for the congestion index results in the equation $$I = dt(a'P + b')$$

where I is the congestion index, "dt" is the time required for a vehicle to move between two fixed points, P is the number of vehicles passing a measuring point in a unit of time, and "a'" and "b'" are new constants.

In accordance with the invention, the congestion index I is determined at one or more points in a highway or highway system and is reflected in the form of an electrical voltage value, for example, whereby traffic directive indicia may be controlled in accordance with prevailing congestion indices, in order to effect corrective or preventative control of the traffic flow.

Referring now to the drawing and initially to Fig. 1 thereof, the numeral 10 designates a highway intersection at which a multi-lane highway 11 joins with a second highway 12. In the illustrated highway system, the highways 11, 12 rejoin at a second intersection 13, so that, in effect, the highways 11, 12 form alternate routes. Also, in the illustrated system, a cross highway 14 intersects both the primary highways 11, 12, and feeder highways 15, 16 intersect the highways 11, 12, respectively. It will be understood, of course, that the described highway system is merely illustrative, and is not to be considered as imposing any limitation on the invention.

In the illustrated system, the flow of traffic moving from left to right in Fig. 1 is subject to automatic control, in accordance with the invention, to the end that traffic congestion at points along the primary highways 11, 12 is determined and interrelated. The congestion indicia is then translated into a usable form, whereby a traffic directive sign 17, of the type shown in Fig. 2, for example, may be appropriately energized to direct vehicles approaching the intersection 10 onto one or the other of the highways 11 or 12. In accordance with the invention, traffic congestion is measured at a number of points, including points adajcent to the cross and feeder highways 14—16, whereby the effect of vehicular movements to and from such highways is taken account of, and the plurality of congestion determinations are interrelated to reflect the relative effect thereof at the intersection 10. The sign 17, positioned ahead of the intersection 10, is then automatically energized to present traffic-directive indicia for directing the flow of traffic onto a desired one of the alternative highways 11, 12.

In the system of Fig. 1, traffic congestion along the principal highway 11 is measured at a plurality of points 18—22, the measurements at each point being made in each of the several lanes provided for traffic moving from left to right. Congestion is also measured at points 150—152 on the cross and feeder highways 14, 15, in the lanes thereof feeding traffic onto the main highway 11. In a similar manner, congestion is measured at a plurality of points 23—27 along the alternate highway 12 and at points, not specifically indicated, along lanes of highways 14, 16 feeding traffic onto the alternate highway 12. In accordance with one form of the invention, the separate congestion measurements, taken at the several points on each highway, are weighted in accordance wtih the effect of congestion at the respective points on the flow of traffic along the main and alternate highways 11, 12 and at or near the intersection 10. The weighted values for each of the highways 11, 12 and its feeders are added, providing, for each highway, an indication of traffic congestion or anticipated congestion throughout a portion of its length, in terms of its effect at or near the intersection. The added measurements are automatically compared, and the traffic directive sign 17 is energized accordingly, to direct traffic onto the highway best adapted, at the time, to receive it.

In order to determine traffic congestion at a particular point on a highway, an apparatus of the type shown in Fig. 4 may be advantageously employed. The apparatus comprises means such as trip plates 28, 29 set in a highway lane to detect both the number and speed of vehicles passing thereover. It is contemplated, of course, that other conventional traffic detecting devices, such as photoelectric cells or the like, may be used for this purpose; and, advantageously, where a pair of spaced detectors are used, they are spaced apart a distance such that one vehicle is registered by both detectors before a following vehicle begins to pass the detecting point.

In the preferred form of the invention, the trip plates 28, 29 constitute part of an electrical circuit leading to a congestion index computer 30, which is arranged to process signals, provided by passing vehicles, in a manner such as to provide an electrical signal representative of the congestion index I, mentioned hereinbefore.

Referring now to Fig. 6, the congestion index computer 30 includes a gaseous discharge valve 31, such as a conventional thyratron, which has an anode-cathode circuit comprising a source of direct current voltage and a normally closed switch 29a, actuated by the trip plate 29 placed second in the line of traffic flow. The control grid circuit for the valve 31 includes a source 32 of negative bias, which normally maintains the valve in a non-conducting condition, and a source 33 of positive grid potential connected in series with a normally open switch 28a, actuated by the first trip plate 28.

When a vehicle passes over the first plate 28, switch 28a is momentarily closed and negative grid bias on the valve 31 is overcome. Conduction is thereupon initiated in the valve 31, establishing a voltage across cathode resistor 34. Conduction in the valve continues, even after switch 28a is reopened, until the vehicle passes over the second trip plate 29, actuating switch 29a to momentarily open the anode-cathode circuit for the valve 31.

A vehicle passing over the trip plates 28, 29 at a given speed, will cause conduction in the valve 31 for a length of time "dt," producing a voltage pulse of predetermined magnitude and of duration equal to "dt." The pulse thus formed (indicated at 35 in Fig. 6) is differentiated in a circuit 36 to produce a sharp positive spike (indicated at 37) marking the leading edge of the pulse.

The positive spike 37 is used to trigger a one-cycle multivibrator 38, the output of which is a single pulse (indicated at 39) of constant amplitude and of a duration much less than the shortest anticipated pulse 35.

Advantageously, the duration and/or amplitude of the pulse 39 is the function of an adjustable constant, which, in terms of the derived equation mentioned before, is related to the constant "$a'$." The output of the multivibrator 38 is then passed through a buffer circuit 40, in which the pulse is superimposed on a D.C. output bias voltage representative of the constant "$b'$."

Each pulse from the output of the buffer circuit 40 is passed through an integrating circuit 41, which provides an output voltage proportioned to $a'P+b'$ in terms of the before mentioned equation. The integrator voltage output is then applied to a buffer-amplifier 42, the output voltage signal thereof being fed to a chopper 43, which converts the signal into square waves at a reference frequency, advantageously at 60 cycles per second.

The small arrows to the circuits 38, 40, 43, in Fig. 6, represent reference voltages used in regulating the operation of the respective circuits.

The square-wave output of the chopper 43 is compared with a reference potential at potentiometer 44, and a servo-motor 45 is energized in accordance with the differential, if any, to adjust the arm of the potentiometer 44 and also the arm of a second potentiometer 46.

Each pulse from the valve 31 is also fed to a buffer-amplifier 47, and then to an integrating circuit 48, the output of which is proportioned to the average value of "$dt$." This output voltage is, in turn, fed to a second buffer-amplifier 49, and the output of the amplifier is applied to the terminals of the servo-adjusted potentiometer 46.

Output leads 50, from the servo-adjusted potentiometer 46 are thus at a potential difference determined by a voltage value (across the potentiometer 46) representing "$dt$" and a potentiometer setting representing ($a'P+b'$), in terms of the beforementioned equation. The output voltage at the leads 50 thus represents $dt(a'P+b')$, which also represents the congestion index, I, sought to be determined.

As thus determined, the congestion index may be utilized in a variety of ways to effectuate desired traffic flow control. In the specific arrangement of Fig. 1, congestion index computers are provided at or in association with each of the measuring points 18—27, 150—152 and a control circuit of the type illustrated schematically in Fig. 5 may be employed. Thus, in Fig. 5, pairs of congestion index computers such as 54, 55—56, 57 are provided for the measuring points 18—22 on dual lane highway 11, computers 51—53 are provided for the measuring points 150–152 on the feeder and cross highways, and computers 58—60 are provided for each of the measuring points 23—27 on highway 12.

Output signals from the pairs of 54, 55—56, 57 computers for highway 11 are fed into separate weighting circuits such as indicated at 64, 70, to be described, where the separate signals are modified to reflect the anticipated effect at one point of congestion at the measured points, i.e., in the specific example of Fig. 1, the effect at the intersection 10 of congestion at the respective measuring points 18—22. Likewise, signals from the computers 51—53, for the highway lanes feeding the main highway 11 (points 150—152), are fed to weighting circuits 61—63, which modify the signals to reflect the anticipated congestion to be caused by the feeder traffic. The weighting circuits may be adjusted on the basis of traffic surveys, for example, or an approximation may be made by adjusting the weighting circuits so that the measurements made at points closer to the intersection weigh more heavily in the final determination.

A simplified form of weighting circuit is illustrated in Fig. 7, as comprising a potentiometer, across the end terminals of which is applied the congestion index signal from a congestion index computer. An adjustable element 66 is used for regulating the position of the potentiometer arm 65a, whereby a predetermined portion of the computed congestion index signal is applied to the output leads 67 of the potentiometer.

Figure 9:
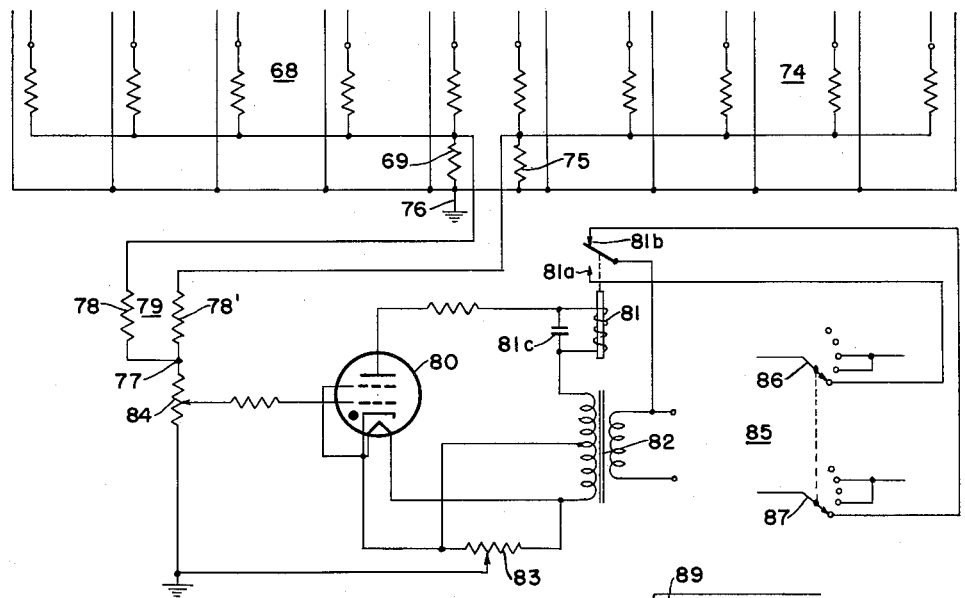

Weighted congestion index signals from the respective weighting circuits 61—63 and 64, 70 are directed to a summing circuit 68 (Fig. 5), by means of which a voltage signal, representing a summation of the respective weighted signals, is applied across a resistor 69 (Fig. 9).

Congestion index signals from the second set of computers 58—60 are likewise applied to weighting circuits 71—73, and the weighted signals are applied to a summing circuit 74 which causes a signal representing a summation of the several weighted signals to be impressed upon a resistor 75 (Fig. 9).

In the illustrated circuitry, the summation resistors 69, 75 have a common ground 76, and are arranged so that the respective signal potentials are applied thereto with opposite polarities. The ungrounded terminals of the resistor are connected to each other at a terminal point 77, through resistors 78, 78' forming a balance circuit 79 (Fig. 5). The arrangement is such that if the summation signal voltages across the respective resistors 69, 75 are equal, point 77 will be at zero potential, with respect to ground. However, if the voltages are unbalanced, point 77 will assume a positive or negative potential with respect to ground, depending upon which of the resistors 69, 75 had the greater potential drop.

As shown in Fig. 9, the terminal point 77 is connected in the control grid circuit of a gaseous discharge valve 80. The valve 80 has an anode-cathode circuit including a relay 81 and a source of A.C. voltage 82, whereby the valve is caused to conduct on alternate half-cylces, when the grid potential is within a predetermined range.

The control grid circuit for the valve 80 includes an A.C. source of negative bias, including a bias resistor 83, and a potentiometer 84 connected to the terminal point 77. The grid bias is such that the valve is normally nonconductive. However, when the terminal point 77 turns sufficiently positive, with respect to ground, the valve will be caused to conduct during alternate half cycles to energize the relay 81 and close the contacts 81a thereof. A capacitor 81c maintains the energization of the relay during non-conducting half cycles.

When the terminal point 77 turns sufficiently negative, conduction is blocked in the valve 80, de-energizing relay 81 and causing contact 81b thereof to close. It will be understood, of course, that the characteristics of the valve 80 are such that the grid signal must be lowered considerably, after conduction has been initiated, in order to block further conduction. This is advantageous, as will appear, since slight variations in the summation signals will not cause the valve 80 to oscillate on and off. The hysteresis in the on-off control of the balance circuit valve 80 may be regulated by adjusting the potentiometer 84, so that the sensitivity of the balance circuit may be varied as desired.

Switch contacts 81a, 81b of the relay 81 are part of a control selector circuit 85 including selector switches 86, 87. The switches 86, 87 are, in turn, connected through a time delay circuit 88 (Fig. 5) to a directional indicator which, for the purpose of this illustration, will be considered as the traffic directive sign 17.

When the relay contact 81b is closed, as when the negative summation voltage on, for example, the resistor 75 overbalances the voltage on resistor 69, an arrow 17a on the traffic directive sign 17 will have one head 17b thereof lighted, directing traffic onto highway 11. If the traffic congestion on the highway 11 and/or its feeder lanes becomes materially greater than the congestion or anticipated congestion on the highway 12, valve 80 will be rendered conducting, and relay contact 81a will close to light head portion 17c of the arrow 17a, and extinguish head portion 17b. This causes traffic to be directed onto highway 12, until such time as the congestion balance is materially reversed.

Figure 10:
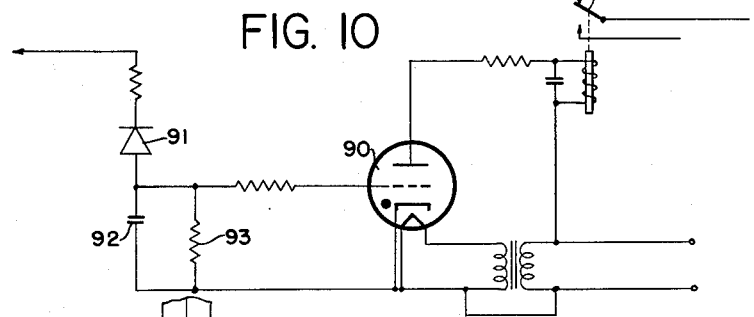

Advantageously, when the indicator arrow 17a of traffic directive sign 17 is changed, so that traffic is directed onto a different highway, both arrowheads 17b, 17c are lighted simultaneously for a short period, before the previously lighted head is extinguished, to assure a smooth transition in the flow of traffic. This is accomplished by the time delay circuit 88, shown in part in Fig. 10.

In the illustrated time delay circuit, each arrowhead portion is controlled by a relay, such as relay 89, having a set of normally closed contacts which complete the energizing circuit for the arrowhead. When the condition of the main selector relay is such that arrowhead 17b, for example, is to be lighted, a circuit is completed through selector switch 87, applying a high negative bias to the grid circuit of a gaseous discharge valve 90, through a rectifier 91. This maintains the valve 90 in a nonconductive state, so that relay 89 is de-energized and the lighting circuit for arrowhead 17b is completed.

When the selector relay 81 is actuated, the bias circuit is opened, and a grid capacitor 92 begins to discharge through a resistor 93. After a preset time, the grid loses its strong negative potential, and the valve 90 begins conducting to actuate relay 89 and extinguish the arrowhead 17b. A similar time delay circuit is associated with the opposite arrowhead 17c, as will be understood.

It may be expected that, upon any highway system, occasional accidents, or mechanical failure of vehicles, will cause traffic tie-ups which will bring vehicles to a complete halt, or at least slow them greatly, so that considerable congestion is created and the flow of additional vehicles onto the highway, or lane, is undesirable. With reference to the basic equation representing "congestion," it will be observed that, as vehicle speed approaches zero, the term $$\frac{S_o}{S}$$

approaches infinity, indicating maximum congestion. However, as a practical matter, the physical circuitry utilized to measure and determine "congestion" cannot reliably reflect complete stoppage of vehicles, for example, since vehicles may pass over the measuring point at a normal speed and come to a complete halt at a point farther along the highway. Accordingly, where traffic is brought to a complete halt along the highway, and no vehicles (or only a few) are passing the various measuring points, the control system may indicate a complete absence of congestion, in the same manner as if there were a complete absence of vehicles on the highway.

In accordance with one aspect of the invention, proper control of traffic, in the event of complete or partial traffic stoppage, is provided by means of the modified circuitry of Fig. 6a. In the modified arrangement, one or more detector coils 200 are located in or near the highway lane, in the vicinity of a set of trip plates 201, 202, corresponding to trip plates 28, 29 of Fig. 6. Each coil forms part of a tuned-oscillator detector circuit, indicated generally at 203, which may be of conventional form. The arrangement is such that the mere presence of a vehicle in proximity to the coil 200 causes an oscillator frequency shift of sufficient magnitude to produce a signal pulse at the output of the detector circuit 20. Advantageously, the nature and location of the coil 200 is such that, in a multi-lane highway, the presence of a vehicle in an adjacent lane will not have any substantial effect on the detector circuit.

Associated with the detector circuit 203 is a pulse length gate 204, which, per se, may be conventional, and which is arranged to accept only those pulses which are of predetermined duration. For example, it is contemplated that pulses of approximately two to three seconds duration will be accepted, while pulses of shorter duration will be blocked.

In the circuit of Fig. 6a, the output pulses of the pulse gate 204 are directed to a pulse extender 205 which, in itself, may be conventional. The extender 205 is so designed that each input pulse thereto is extended by a fixed interval, in the order of ten to fifteen seconds.

Pulses transmitted from the extender 205 are directed to a count gate 206, the function of which will be described in greater detail, and when the gate 206 is "open," pulses are transmitted to a relay 207, causing the latter to be energized. The relay 207 has a set of normally open contacts 207a, connected to a potential source 208, the value of which is equivalent to a signal potential indicating maximum congestion. Thus, under appropriate conditions, signals or pulses caused by the extended or sustained presence of a vehicle in a predetermined area near the coil 200 causes the modified congestion index computer of Fig. 6a to indicate maximum congestion.

Control of the count gate 206, to pass or block pulses from the pulse extender 205, is advantageously effected in accordance with the rate at which vehicles pass over the trip plates 201, 202, to the end that passage of vehicles at a sufficient rate will cause the count gate 206 to block pulses and permit the congestion index computer to function in the usual manner. Thus, the trip plates 201, 202 are connected to a pulse generator circuit 209, corresponding to elements 31—34 of Fig. 6. Pulses generated therein are directed, in part, to a speed determining circuit 210, corresponding to elements 47—49 of Fig. 6, and to a multiplying circuit 211, corresponding to elements 44—46 of Fig. 6. Pulses from the generator 209 are also directed, in part, to a vehicle counting circuit 212, corresponding to elements 36, 38 of Fig. 6, to an adding circuit 213, corresponding to elements 40—43 of Fig. 6, and to the multiplying circuit 211. The output of the multiplying circuit 211 is directed through normally closed contacts 207b of relay 207 and is equivalent to the output at leads 50, in Fig. 6.

In the modified circuit of Fig. 6a, the vehicle counting circuit is coupled with the count gate 206 by appropriate means indicated at 214. Accordingly, the passage of vehicles over the trip plates 201, 202 is registered at the count gate 206. And, in accordance with the invention, when the rate of passage of vehicles over the plates 201, 202 exceeds a predetermined minimum, the count gate 206 blocks all pulses from the extender 205. The relay 207 therefore is de-energized, and the congestion index computer operates in the usual manner.

Complete, or near, stoppage of traffic on a particular highway, or lane, as determined as (a) the extended area sustained presence of one or more vehicles on the highway, or lane, in question, in a predetermined area, in the immediate vicinity of the detector coil 200, and (b) the absence of the passage of vehicles at a predetermined minimum rate over the plates 201, 202, causes the gate 206 to pass pulses from the extender 205. The relay 207 thus becomes energized, and the congestion index computer provides an artificial control signal, from source 208, equivalent to maximum congestion. The source 208 and its relay contacts 207a may be referred to as an artificial signal producing means.

In many cases, the control of traffic flow should be modified periodically, throughout the day, to accommodate such recurring variables as rush hour traffic, school hours, etc. Accordingly, circuit means, such as shown in Fig. 8, may be employed whereby factors variable with time are automatically provided for.

In the circuit of Fig. 8, the D.C. voltage signal from a congestion index computer is applied across a potentiometer 94, the movable arm 94a of which is adjusted by a motor-driven cam 95, as a function of time. The output of potentiometer 94 may be applied across the terminals of a second potentiometer 96, the movable arm 96a of which is adjusted by a cam 97 driven by a servomotor 98. The servomotor is acted upon by an A.C. reference potential 99, and by a square wave potential derived from the congestion index voltage signal by means of a chopper 100. The small arrow to the chopper circuit 100 represents a reference voltage used in regulating the operation of the circuit. The contour of the cams 95, 97 may be determined empirically, or otherwise, so that the congestion index signals are variably weighted, as a function of time and of the congestion index, to best suit the specific requirements of a particular installation. In a typical traffic control system, one or more, but not necessarily all of the congestion index computers may be provided with time-variable weighting controls, as at 101—103, in Fig. 5.

In many cases, it may be desirable to route the several computed congestion index signals to a remotely located central control station, as indicated at 104 in Fig. 5, so that traffic conditions at the separate measuring points may be continuously observed. It is contemplated that suitable control means will be provided in the control station for manually controlling the traffic directive sign under emergency and other unusual conditions. Moreover, it will be noted that each congestion index computer has available, as an output (pulse from amplifier 47, Fig. 6), a signal directly related to the speed of individual vehicles passing a particular measuring point. This may be of value in law enforcement and/or traffic survey operation.

As will be readily understood, the basic elements of the new control system may be applied in a variety of ways, one specific example being, in the control of traffic flow in the several lanes of a multi-lane highway. Thus, in Fig. 3, for example, a multi-lane highway 105, toll gate approach, or the like, is provided with an overhead structure 106 bearing controllably energizable traffic directive indicia. In such an installation, the control system may be employed to advise traffic, in advance, of the least congested lane.

Figure 11:
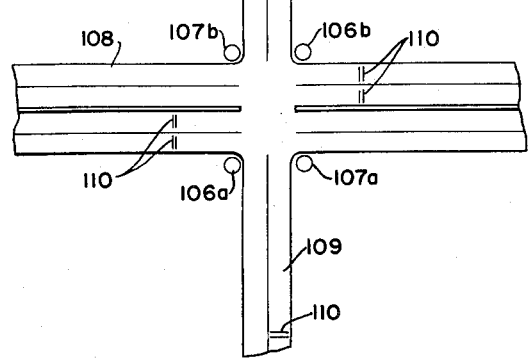
Fig. 11 is a simplified plan view of a highway intersection at which control means in accordance with the invention are utilized for regulating traffic flow.

In the system of Figs. 11–13 the new control apparatus may be advantageously utilized in the control of traffic stop-and-go lights at a highway intersection. In the representative highway intersection shown in Fig. 11, pairs of traffic lights 106a, 106b and 107a, 107b are provided at the intersection of highways 108, 109, highway 108 being a multiple lane highway in the illustration.

Each of the highway lanes leading to the intersection is provided with one or more sets of detectors and computors 110, of the type shown in Fig. 4, so that congestion index measurements are made at one or more points in the flow paths leading to the intersection.

Congestion index measurements, made on the opposite approaches to the intersection along highway 108, are fed separately into a gating circuit 111 (Fig. 12), in the form of voltage signals, and the gating circuit, which may be of conventional design, selects the larger of the voltages and passes it along as an output signal. In a similar manner, congestion index measurements made on the opposite approaches to the intersection along highway 109 are fed to a second gating circuit 112, which selects the larger voltage value and passes it on as an output voltage.

Congestion index voltage signals from the respective gating circuits 111, 112 are fed into choppers, 113, 114, respectively, which convert the signals into square waves at a reference frequency. The respective square wave signals are then fed to servomotors 115, 116, which balance the signals against reference voltage potentiometers 117, 118. The servomotors 115, 116 operate adjustable arms of potentiometers 119, 120 forming part of a bridge network 121, including a fixed resistor 122 and a servo-driven potentiometer 123.

Operation of one or both of the servomotors 115, 116 causes the bridge 121 to become unbalanced, and energizes a third servomotor 124, which adjusts the potentiometer 123 until the bridge is again in balance. The servomotor 124 is also connected to a lead screw 125, carrying a cam follower 126 co-acting with a three dimensional cam 127. The cam 127 has low and high surfaces which, from one end of the cam to the other, vary in proportion. The arrangement is such that as the cam is rotated at constant speed, by a motor 128, the cam follower 126 is raised during a predetermined portion of each revolution, depending upon the location of the follower, axially, along the cam.

In the illustrated system, the cam follower 126 actuates a switch 129 (Fig. 13), between one of two circuit completing positions, as it moves between high and low portions of the cam 127. When contacts 129a of the switch 129 are initially closed, a circuit is completed to a relay 130, which is advantageously a time delay relay. The initial closing of contacts 129a also completes a circuit through normally closed contacts 130a of the relay 130, to energize the amber light 131 of the traffic signals 107a, 107b. The green light 132 of this signal, and the red light 133 of signal 106 have been energized previously through a circuit including normally closed contacts 134a of a relay 134.

A predetermined time after energization, the relay 130 actuates, closing contacts 130b and opening contacts 130a to the amber light. Closing of contacts 130b completes a circuit to, and energizes relay 134, to open contacts 134a thereof and close contacts 134b and 134c. Opening and closing, respectively, of contacts 134a, 134b extinguishes the red and green lights 133, 132 and energizes green and red lights 135, 136, of the signals 106, 107, while closing of contacts 134c completes a hold-in circuit for relay 134, through normally closed contacts 137a of a relay 137.

Upon continued rotation of the three dimensional cam 127 the switch 129 is actuated to open contacts 129a and close contacts 129b thereof. This simultaneously de-energizes time delay relay 130 and energizes a second time delay relay 138. Green and red lights 135, 136 remain on for a period, however, since the relay 134 is held in an energized condition through the circuit including contacts 137a; and, at the same time, amber light 139 is energized through a circuit including normally closed contacts 138a of time delay relay 138.

After a predetermined delay period, relay 138 is actuated, closing contact 138b thereof and reversing the traffic lights. This cycle repeats, being varied only in the respective periods of energization, as determined by the position of the cam follower 126, axially, along the three dimensional cam 127.

The new system provides a new approach to the problem of traffic flow control, whereby traffic "congestion," as referenced to a preferred or normal congestion, forms the basis for directing the flow of traffic. The method and apparatus of the invention is founded on the principle that mere numbers of vehicles on a highway or highway lane does not necessarily render the traffic condition undesirable. Rather, the number of vehicles, taken together with the average rate of movement thereof, reflects the "congestion" of the traffic, and the actual "congestion," referenced to a normal or preferred "congestion," provides a realistic criterion for directing the flow of traffic in a manner which will effectively prevent or remedy undesirable traffic conditions, to the extent possible under the circumstances.

In accordance with the new system, realistic traffic control may be applied in a variety of ways, to divert or regulate the flow of traffic at an intersection, for example, or to direct approaching vehicles into a relatively uncongested flow path, the foregoing being merely by way of example and not of limitation.

One of the important aspects of the invention resides in the provision of an improved method and system for controlling the flow of vehicular traffic, whereby highway congestion at a point or points is anticipated and reflected before it actually occurs. Accordingly, a certain lead time is provided, in which remedial or corrective action is taken to alleviate the congestion before it actually occurs.

Another important aspect of the invention resides in the provision of a generally simplified and wholly practical arrangement for directing the flow of traffic in the event of complete or near stoppage of traffic on one or more highways or lanes of a highway system. The new arrangement provides that the presence of a vehicle, coupled with the lack of vehicle movement, will cause the control system to reflect maximum or high congestion.

It should be understood, however, that the forms of the invention specifically illustrated and described herein are merely representative. For example, the specific circuitry described herein may be varied substantially in its make-up, or, in some cases mechanical means may be employed. Such variations are considered to be within the capabilities of one skilled in the art and therefore within the scope of this invention. Accordingly, the scope of the invention should be determined by reference to the following appended claims.

This application is a continuation-in-part of my co-pending application, Serial No. 635,318, filed January 22, 1957 now United States Patent No. 2,933,716 issued April 19, 1960.

I claim:

1. Apparatus for controlling the flow of vehicular traffic in a flow path, which comprises spaced detecting means actuable upon the passage of a vehicle thereby to detect the passage of said vehicle and the speed of movement thereof, first circuit means providing an electrical signal which is a function of the number of vehicles passing said detecting means in a unit of time, second circuit means providing an electrical signal which is an inverse function of the speed of vehicles passing said detecting means, means to interrelate the factors of passage and speed thus detected comprising third circuit means for, at least in effect, multiplying said electrical signals to provide a control signal which is a function of vehicular congestion level in the flow path, means for, at least in effect, comparing said control signal with a predetermined congestion level, artificial signal producing means, associated with said speed detecting means and responsive to the sustained presence of a vehicle in a predetermined area adjacent said speed detecting means, to impart, to said means for comparing, an artificial control signal corresponding to a control signal regularly generated in response to maximum moving vehicular congestion, and traffic directive means positioned in proximity to said flow path and controlled, at least in part, by said means to interrelate.

2. Apparatus according to claim 1, in which said artificial signal producing means comprises a constant signal source arranged in parallel circuit relation to said interrelating means, and a switching relay for connecting the constant signal source and interrelating means alternatively for effective circuit operation with said means for comparing, said means responsive to the sustained presence of a vehicle in a predetermined area being operable to actuate said relay.

References Cited in the file of this patent

UNITED STATES PATENTS

| 2,100,831 | Barker | Nov. 30, 1937 |
| 2,532,231 | Jarvis | Nov. 28, 1950 |
| 2,751,574 | Jeffers | June 16, 1956 |

FOREIGN PATENTS

| 436,883 | Great Britain | Oct. 21, 1935 |

OTHER REFERENCES

"The American City," September 1948, pages 143 and 145.